United States Patent
Cha

(10) Patent No.: US 9,489,253 B2
(45) Date of Patent: Nov. 8, 2016

(54) MEMORY CONTROLLER AND METHOD OF OPERATING MEMORY CONTROLLER FOR READING DATA FROM MEMORY DEVICE AT HIGH SPEED

(71) Applicant: SAMSUNG ELECTRONICS CO., LTD., Suwon-Si, Gyeonggi-Do (KR)

(72) Inventor: Sang-Soo Cha, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 187 days.

(21) Appl. No.: 14/303,658

(22) Filed: Jun. 13, 2014

(65) Prior Publication Data

US 2015/0149858 A1    May 28, 2015

(30) Foreign Application Priority Data

Nov. 27, 2013 (KR) .................. 10-2013-0145466

(51) Int. Cl.
*H03M 13/00* (2006.01)
*G06F 11/10* (2006.01)

(52) U.S. Cl.
CPC .................... *G06F 11/10* (2013.01)

(58) Field of Classification Search
CPC . H04L 1/0057; H04L 1/0061; H04L 1/0041; H04L 1/0083; H04L 1/0072
USPC ........................................................ 714/776
See application file for complete search history.

(56) References Cited

U.S. PATENT DOCUMENTS

| | | | |
|---|---|---|---|
| 5,785,877 A * | 7/1998 | Sato | C23F 4/00 216/67 |
| 7,408,834 B2 | 8/2008 | Conley et al. | |
| 7,525,842 B2 | 4/2009 | Nguyen et al. | |
| 7,689,741 B2 | 3/2010 | Kang et al. | |
| 8,036,040 B2 | 10/2011 | Shiota et al. | |
| 8,103,920 B2 | 1/2012 | Nagadomi | |
| 8,176,215 B2 | 5/2012 | Ito | |
| 8,364,881 B2 | 1/2013 | Urabe | |
| 8,423,703 B2 | 4/2013 | Jo et al. | |
| 8,438,453 B2 | 5/2013 | Post et al. | |
| 8,495,332 B2 | 7/2013 | Wakrat et al. | |
| 2005/0268203 A1* | 12/2005 | Keays | G06F 11/1048 714/758 |
| 2009/0172499 A1* | 7/2009 | Olbrich | G06F 13/1657 714/773 |
| 2010/0146368 A1* | 6/2010 | Chishti | G06F 11/1064 714/755 |

FOREIGN PATENT DOCUMENTS

JP     2006-236211     9/2006

* cited by examiner

*Primary Examiner* — Albert Decady
*Assistant Examiner* — Enam Ahmed
(74) *Attorney, Agent, or Firm* — Volentine & Whitt, PLLC

(57) ABSTRACT

An method is provided for operating a memory system. The method includes reading data from memory cells connected to a selected word line to generate read data; performing an error correction operation based on the read data and generating segmented error correcting code (ECC) read data; transferring the segmented ECC read data to a host side buffer and increasing a value of a host DMA count; comparing the value of the host DMA count with a read latency count value; selectively updating an ECC status information signal according to the comparison result; and transferring the segmented ECC read data to a host.

19 Claims, 12 Drawing Sheets

MEMORY CONTROLLER AND METHOD OF OPERATING MEMORY CONTROLLER FOR READING DATA FROM MEMORY DEVICE AT HIGH SPEED

CROSS-REFERENCE TO RELATED APPLICATIONS

A claim for priority under 35 U.S.C. §119 is made to Korean Patent Application No. 10-2013-0145466 filed Nov. 27, 2013, in the Korean Intellectual Property Office, the entire contents of which are hereby incorporated by reference.

BACKGROUND

The inventive concepts described herein relate to a semiconductor memory system, and more particularly, to a memory controller capable of transferring data read from a memory device at high speed and a corresponding data transfer method.

A semiconductor memory device is a memory device fabricated using semiconductor materials, such as silicon (Si), germanium (Ge), gallium arsenide (GaAs), indium phosphide (InP), and the like. Semiconductor memory devices are classified as volatile memory devices or nonvolatile memory devices. For example, the volatile memory devices include dynamic random access memory (DRAM) and static random access memory (SRAM), and nonvolatile memory devices include flash memory or magnetic random access memory (MRAM).

The time from when a host issues a read command to a memory device to when the host receives data from the memory device is referred to as read latency. When the read latency becomes longer, the output of data is delayed. Therefore, decreased performance and increased power consumption occur in the host.

SUMMARY

Embodiments of the inventive concept are directed to a method for operating a memory system. The method includes reading data from memory cells connected to a selected word line to generate read data; performing an error correction operation based on the read data and generating segmented error correcting code (ECC) read data; transferring the segmented ECC read data to a host side buffer and increasing a value of a host DMA count; comparing the value of the host DMA count with a read latency count value; selectively updating an ECC status information signal according to the comparison result; and transferring the segmented ECC read data to a host.

When the value of the host DMA count is equal to the read latency count value, the ECC status information signal may be updated and the segmented ECC read data may be transferred to the host. When the value of the host DMA count is not equal to the read latency count value, the segmented ECC read data may be transferred to the host without updating the ECC status information signal.

Performing the error correction operation based on the read data and generating the segmented ECC read data may include storing the read data in an ECC page buffer; generating ECC read data in the ECC core by performing an error correction operation based on the read data stored in the ECC page buffer; and storing the ECC read data in an ECC sector buffer. Generating the segmented ECC read data may include dividing the ECC read data by a size of an internal bus.

The segmented ECC read data may be transferred to the host side buffer in synchronization with an internal clock signal. Also, the value of the host DMA count may be increased when the segmented ECC read data are transferred to the host side buffer.

The method may further include determining whether the value of the host DMA count is equal to a last host DMA count value; and when the value of the host DMA count is not equal to the last host DMA count value, transferring the segmented ECC read data to the host side buffer and increasing the value of the host DMA count.

Other embodiments of the inventive concept art directed to a memory system that includes a memory device and a memory controller configured to control the memory device. The memory controller includes an error correcting code (ECC) unit, a host side buffer, a status control unit, and a clock generator. The ECC unit is configured to perform an error correction operation based on read data received from the memory device, and to generate an ECC done signal and segmented ECC read data. The host side buffer is configured to receive the segmented ECC read data from the ECC unit and to generate a first data receiving signal. The status control unit is configured to receive the ECC done signal from the ECC unit and the first data receiving signal from the host side buffer, and to generate ECC status information in response to the ECC done signal and the first data receiving signal. The clock generator is configured to generate an internal clock signal. The segmented ECC read data are output in synchronization with the internal clock signal and are transferred to the host in response to the ECC status information.

The ECC unit may include an ECC page buffer configured to store read data read out from the memory device; an ECC core configured to perform an error correction operation based on the read data and to generate ECC read data and ECC information; an ECC information unit configured to generate an ECC done signal based on the ECC information; and an ECC sector buffer configured to divide the ECC read data by a size of an internal bus to generate segmented ECC read data. The segmented ECC read data may be output to the host side buffer in response to the ECC done signal.

The ECC information may include the number of data bits error corrected and ECC done information. Also, the host side buffer may generate a first data receiving signal based on the segmented ECC read data.

The status control unit may include a host DMA counter configured to receive the ECC done signal and the first data receiving signal, and to generate a host DMA count according to the internal clock signal; a status determination unit configured to generate a status update signal based on a value of the host DMA count; and a status update unit configured to generate the ECC status information in response to the status update signal.

When the ECC done signal and the first data receiving signal are activated, a value of the host DMA count may increase according to the internal clock signal. The status update signal may be activated when the value of the host DMA count is equal to a read latency count value. The segmented ECC read data may be transferred to the host in synchronization with a clock having a period slower than the internal clock signal.

Other embodiments of the inventive concept art directed to a memory controller configured to control a memory device. The memory controller includes an ECC unit, a host side buffer, and a status control unit. The ECC unit is configured to receive read data read from a plurality of memory cells connected to a selected word line of the memory device, to perform an error correction operation on the read data, and to generate an ECC done signal and segmented ECC read data. The host side buffer is configured to receive the segmented ECC read data from the ECC unit and to generate a first data receiving signal. The status control unit is configured to receive the ECC done signal from the ECC unit and the first data receiving signal from the host side buffer, to increase a value of a host DMA count in response, to compare the value of the host DMA count with a read latency count value, and to selectively update an ECC status information signal according to the comparison result. When the value of the host DMA count is equal to the read latency count value, the ECC status information signal is updated and the segmented ECC read data are transferred to the host from the host side buffer. When the value of the host DMA count is not equal to the read latency count value, the segmented ECC read data are transferred to the host from the host side buffer without updating the ECC status information signal.

The ECC unit may include an ECC page buffer configured to store the read data; an ECC core configured to generate ECC read data by performing an error correction operation on the read data; and an ECC sector buffer configured to store the ECC read data The segmented ECC read data may be generated by dividing the ECC read data by a size of an internal bus.

The segmented ECC read data may be transferred to the host side buffer in synchronization with an internal clock signal. The value of the host DMA count may increase whenever the segmented ECC read data are transferred to the host side buffer. When the value of the host DMA count does not equal a last host DMA value, the segmented ECC read data may be transferred to the host side buffer and the value of the host DMA count may be increased.

With embodiments of the inventive concept, if first segmented ECC read data SED is provided to a host side buffer, a transfer of data to a host starts. This enables read latency to be reduced. Thus, it is possible to perform a read operation at high speed and to reduce a standby power.

BRIEF DESCRIPTION OF THE FIGURES

Exemplary embodiments of the inventive concept will become apparent from the following description with reference to the following figures, in which like reference numerals refer to like parts throughout the various figures unless otherwise specified, and in which.

DETAILED DESCRIPTION

Figure 1:
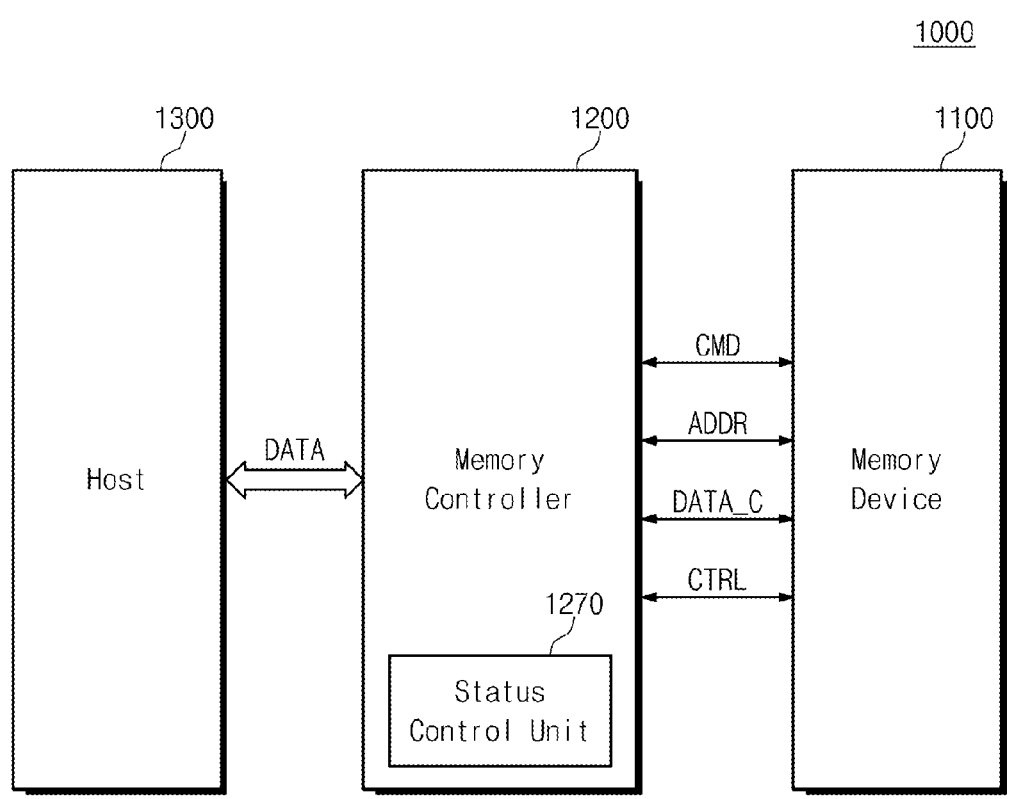
FIG. 1 is a block diagram schematically illustrating a memory system, according to an embodiment of the inventive concept.

Embodiments will be described in detail with reference to the following description and accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to one of ordinary skill in the art. Accordingly, known processes, elements, and techniques are not described with respect to some of the embodiments. Unless otherwise noted, like reference numerals denote like elements throughout the attached drawings and written description, and thus descriptions may be repeated. In the drawings, sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on", "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

I. Memory System Including Status Control Unit

FIG. 1 is a block diagram schematically illustrating a memory system 1000 according to an embodiment of the inventive concept. Referring to FIG. 1, the memory system 1000 includes a memory device 1100, a memory controller 1200, and a host 1300.

The memory device 1100 may be a volatile memory device or a nonvolatile memory device. The volatile memory device is a memory device that loses data stored therein when power is interrupted. The volatile memory device may be an SRAM or a DRAM, for example. The nonvolatile memory device is a memory device that retains data stored therein even when power is interrupted. The nonvolatile memory device may be a read-only memory (ROM), a programmable ROM, an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FeRAM), for example. The memory device 1100 sends read data to the memory controller 1200, and the memory controller 1200 transfers the received data to the host 1300.

The memory controller 1200 is connected between the memory device 1100 and the host 1300. The memory controller 1200 accesses the memory device 1100 in response to a request of the host 1300. The memory controller 1200 receives data from the host 1300 to generate coded data DATA_C. The memory controller 1200 provides the memory device 1100 with a command CMD, an address ADDR, the coded data DATA_C, and a control signal CTRL.

In a read operation, the memory controller 1200 receives the coded data DATA_C from the memory device 1100, and decodes the coded data DATA_C to provide original data. The memory controller 1200 provides the host 1300 with the decoded data, that is, the original data.

As illustrated in FIG. 1, the memory controller 1200 includes a status control unit 1270. When the coded data DATA_C from the memory device 1100 is decoded to the original data, the status control unit 1270 controls a point of time when the original data are transferred to the host 1300.

For example, the status control unit 1270 controls operation of the memory controller 1200 such that the original data are transferred to the host 1300 when data corresponding to an internal bus size of the memory controller 1200 arrives at a host side buffer (refer to FIG. 5) after the original data are generated. In the memory system 1000, according to an embodiment of the inventive concept, since original data are transmitted to the host 1300 at a point of time when the original data arrives at the host side buffer, data read time may be reduced.

Figure 2:
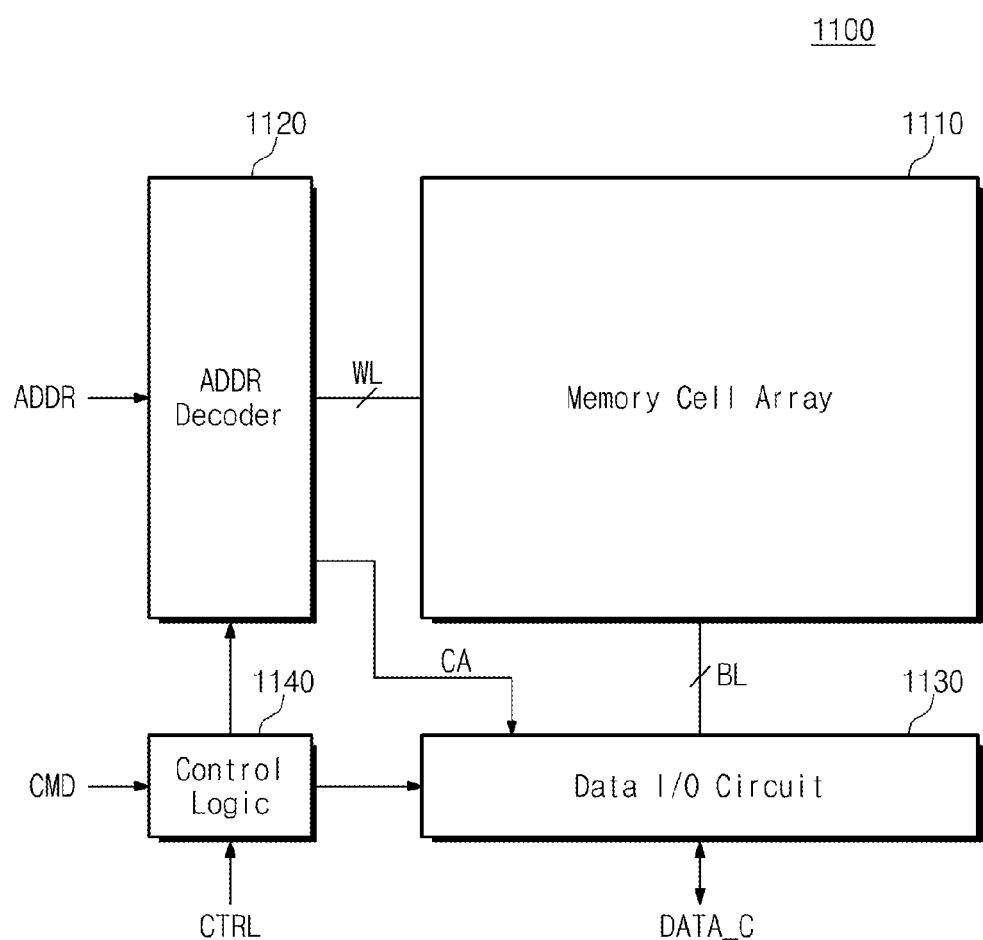
FIG. 2 is a block diagram schematically illustrating a memory device shown in FIG. 1, according to an embodiment of the inventive concept.

FIG. 2 is a block diagram schematically illustrating a memory device 1100 shown in FIG. 1. Referring to FIG. 2, a memory device 1100 includes a memory cell array 1110, an address decoder 1120, a data input and output (I/O) circuit 1130, and control logic 1140.

The memory cell array 1110 is connected to the address decoder 1120 via word lines WL and to the data input and output circuit 1130 via bit lines BL. The memory cell array 1110 includes a plurality of memory cells. Memory cells arranged along a row direction may be connected to the word lines, and memory cells arranged along a column direction are connected to the bit lines BL. A memory cell may store one or more data bits.

The address decoder 1120 is connected to the memory cell array 1110 via the word lines WL. The address decoder 1120 receives an address ADDR from the memory controller 1200 (refer to FIG. 1). The address ADDR includes a row address and a column address. The address decoder 1120 selects one of more word lines using the row address and provides the column address to the data input and output circuit 1130.

The data input and output circuit 1130 is connected to the memory cell array 1110 through the bit lines BL and exchanges coded data DATA_C with the memory controller 1200. The data input and output circuit 1130 operates under control of the control logic 1140. The data input and output circuit 1130 selects one or more bit lines in response to the column address from the address decoder 1120.

The data input and output circuit 1130 provides the memory cell array 1110 with the coded data DATA_C received from an external device (e.g., memory controller 1200). The data input and output circuit 1130 also receives coded data DATA_C from the memory cell array 1110 to output the coded data DATA_C to the memory controller 1200.

The control logic 1140 is connected to the address decoder 1120 and the data input and output circuit 1130. The control logic 1140 receives a command CMD and a control signal CTRL from the memory controller 1200 to control overall operations (e.g., read operations, write operations, and the like) of the memory device 1100.

Figure 3:
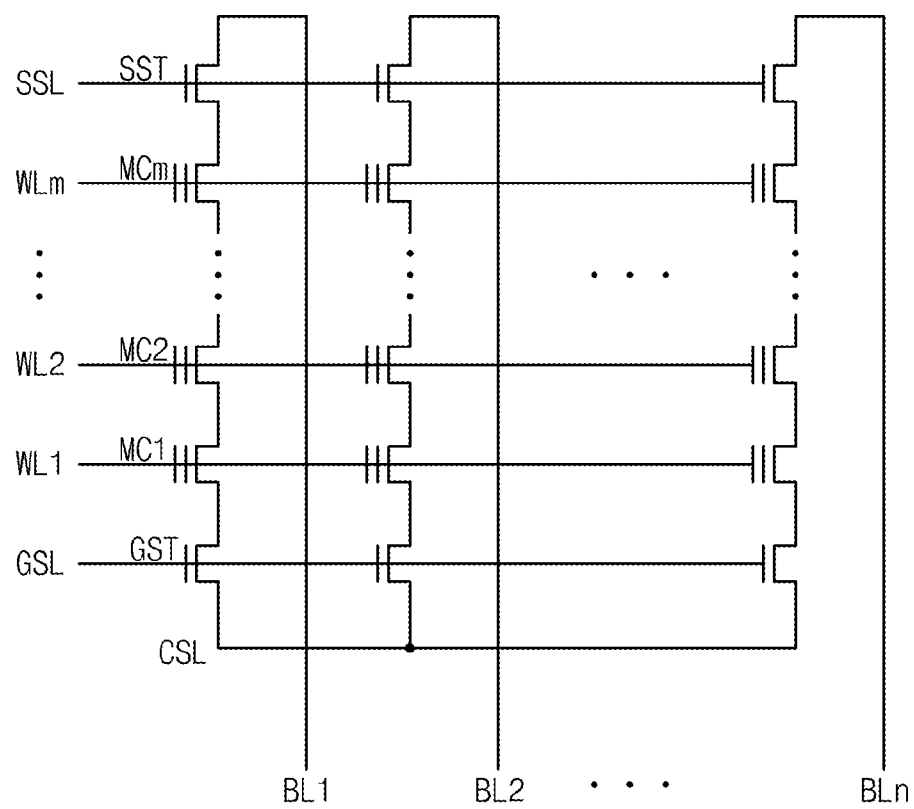
FIGS. 3 and 4 are circuit diagrams a memory cell array shown in FIG. 2, according to embodiments of the inventive concept.
Figure 4:
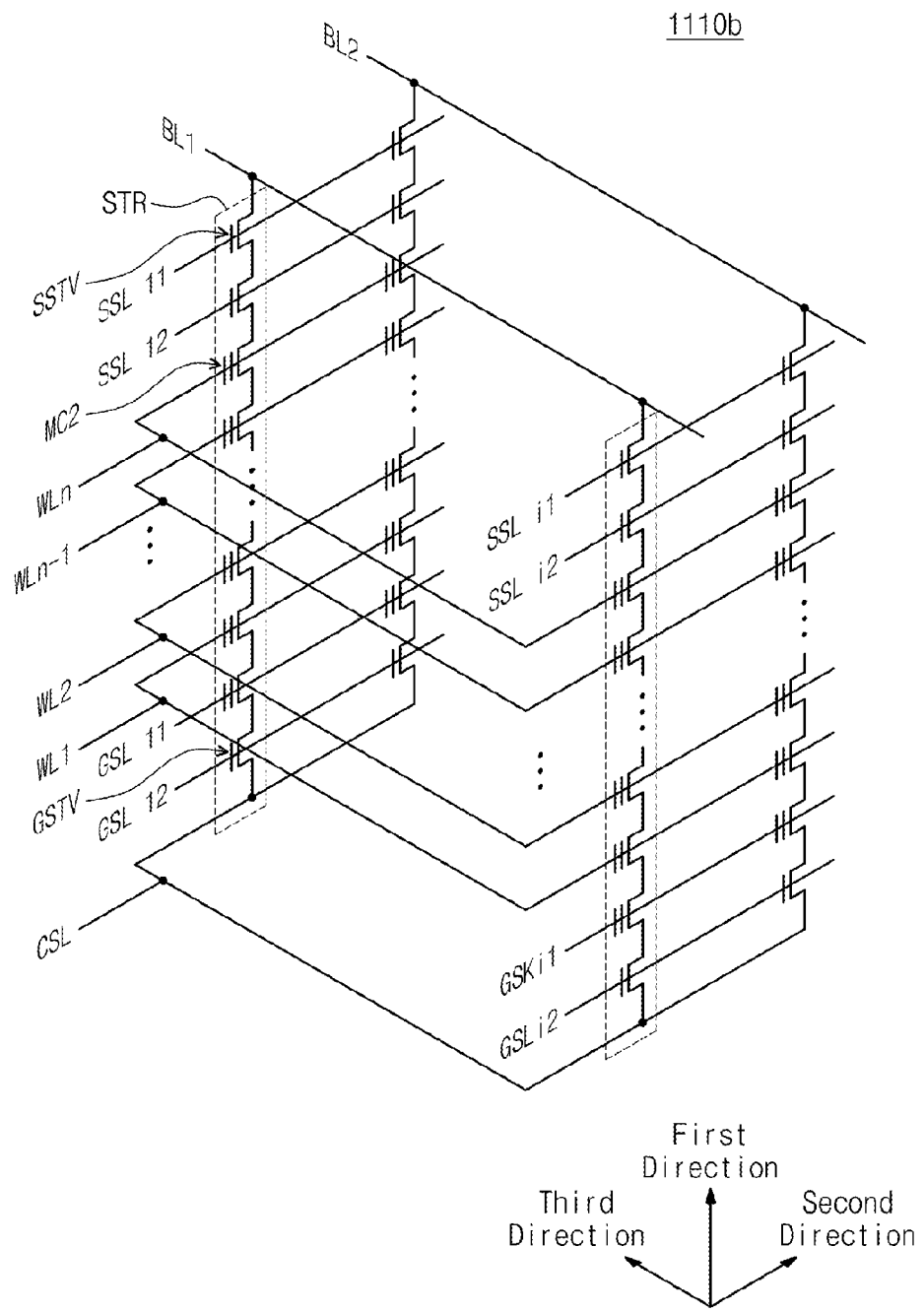

FIGS. 3 and 4 are circuit diagrams of a memory cell array shown in FIG. 2, according to embodiments of the inventive concept. FIG. 3 shows an example of a NAND flash memory, and FIG. 4 shows an example of a vertical NAND flash memory.

Referring to FIG. 3, a memory cell array 1110a includes a plurality of flash memory cells. Memory cells MC1 to MCm provided along a column direction are connected to word lines WL1 to WLm, respectively. Memory cells in the same row are connected to the same word line. Memory cells provided along a column direction are connected to bit line BL1 to BLn. Memory cells in the same column are connected to the same bit line.

In each column a string selection transistor SST is connected between a bit line BLi (i being one of 1 to n) and the memory cells MCm. The string selection transistors SST are connected to a string selection line SSL. In each column, a ground selection transistor GST is connected between a common source line CSL and the memory cell MC1. The ground selection transistors GST are connected to a ground selection line GSL.

Referring to FIG. 4, a memory cell array 1110b includes a plurality of strings STR having a vertical structure. The strings STR are formed along a second direction to form string columns. The string columns are formed along a third direction to form a string array. Each string STR includes ground selection transistors GSTV, memory cells MC2, and string selection transistors SSTV that are serially arranged along a first direction between a corresponding bit line BLi (i being one of 1 to m) and a common source line CSL.

The ground selection transistors GSTV are connected to ground selection lines GSL11, GSL12 ... GSLi2. The string selection transistors SSTV are connected to string selection lines SSL11, SSL12 ... SSLi2. Memory cells MC2 arranged on the same layer are connected in common to one of word lines WL1 to WLn. The ground selection lines GSL11 to GSLi2 extend along the second direction, and are provided in parallel along the third direction. The word lines WL1 to WLn extend along the second direction, and are provided in parallel along the third direction. The bit lines BL1 to BLm extend along the third direction, and are provided in parallel along the second direction. The memory cells MC2 are controlled according to voltages applied to the word lines WL1 to WLm.

As a vertical flash memory device including the memory cell array 1110b includes NAND flash memory cells, like a general NAND flash memory device, it performs write operations and read operations by page units, and performs erase operations by block units.

In exemplary embodiments, two string selection transistors included in a string STR may be configured to be connected to a string selection line, and two ground selection transistors included in a string STR may be configured to be connected to a ground selection line. Alternatively, a string may be configured to include only one string selection transistor and only one ground selection transistor.

Referring again to FIG. 1, the memory system 1000 according to an embodiment of the inventive concept includes the status control unit 1270, which is placed in the memory controller 1200. When data stored in a memory device 1100 is read, the status control unit 1270 transfers original data generated from the read data to the host 1300 at high speed. With the inventive concept, because original data are sent to the host 1300 when the original data reaches an internal buffer, standby time for reading data (hereinafter, referred to as "read latency") and standby power may be reduced.

II. Method of Transferring Read Data at High Speed

Figure 5:
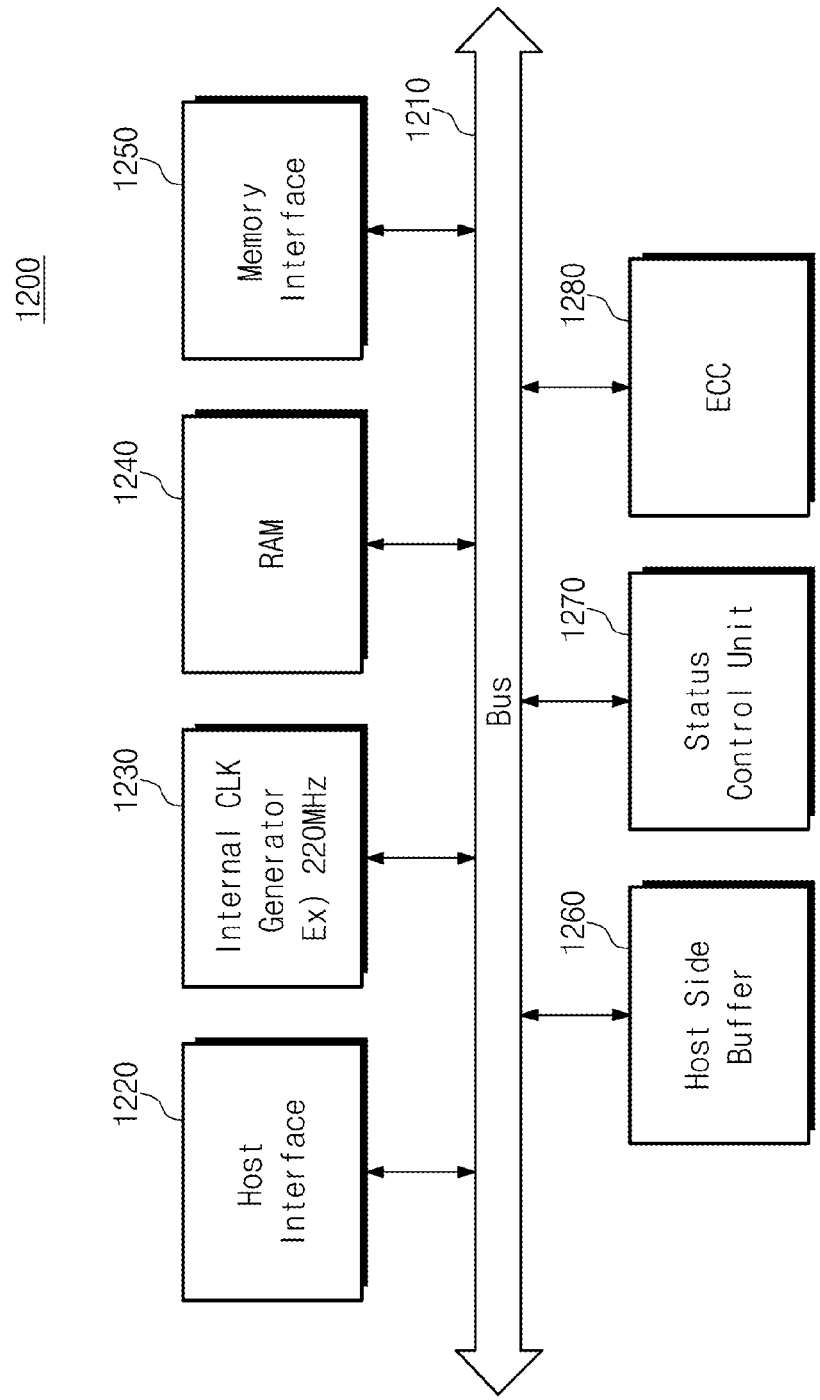
FIG. 5 is a block diagram schematically illustrating a memory controller shown in FIG. 1, according to an embodiment of the inventive concept.

FIG. 5 is a block diagram schematically illustrating a memory controller 1200 shown in FIG. 1, according to an embodiment. Referring to FIG. 5, the memory controller 1200 includes a system bus 1210, a host interface 1220, an internal clock generator 1230, RAM 1240, a memory interface 1250, a host side buffer 1260, the status control unit 1270, and an error correcting code (ECC) unit 1280. The system bus 1210 (or, an internal bus) 1210 may provide a channel among the components 1220 to 1280.

The host interface 1220 communicates with the host 1300 (refer to FIG. 1) according to a specific communication standard. For example, the memory controller 1200 may communicate with the host 1300 through at least one of various communication standards, such as Universal Serial Bus (USB), peripheral component interconnection (PCI), PCI-express (PCI-E), Advanced Technology Attachment (ATA), Serial-ATA, Parallel-ATA, small computer system interface (SCSI), enhanced small disk interface (ESDI), Integrated Drive Electronics (IDE), Firewire, and the like.

The internal clock generator 1230 generates a constant period of internal clock signal provided to the host interface 1220, the RAM 1240, the memory interface 1250, the host side buffer 1260, the status control unit 1270, and the ECC unit 1280. The RAM 1240 may be used as at least one of a working memory, a cache memory, and a buffer memory of the memory controller 1200. The memory interface 1250 interfaces with the memory device 1100 (refer to FIG. 1). The memory interface 1250 may include a NAND flash interface or a VNAND interface, for example.

The host side buffer 1260 communicates with the ECC unit 1280 and the status control unit 1270 through the system bus 1210. For example, the host side buffer 1260 activates a signal indicating that an input of data has ended, based on data for which an ECC procedure is completed. When the ECC procedure is completed and first data corresponding to an internal bus size is provided to the host side buffer 1260, the status control unit 1270 updates a signal informing a data transfer to transfer data to the host 1300. Operation of the status control unit 1270 will be more fully described with reference to FIGS. 6 to 8.

The ECC unit 1280 performs ECC encoding of data (original data) received from the host 1300 to generate coded data DATA_C. The ECC unit 1280 performs ECC decoding of coded data DATA_C received from the memory device 1100 to generate corresponding original data. Performing ECC encoding and ECC decoding may be referred to as ECC execution.

Figure 6:
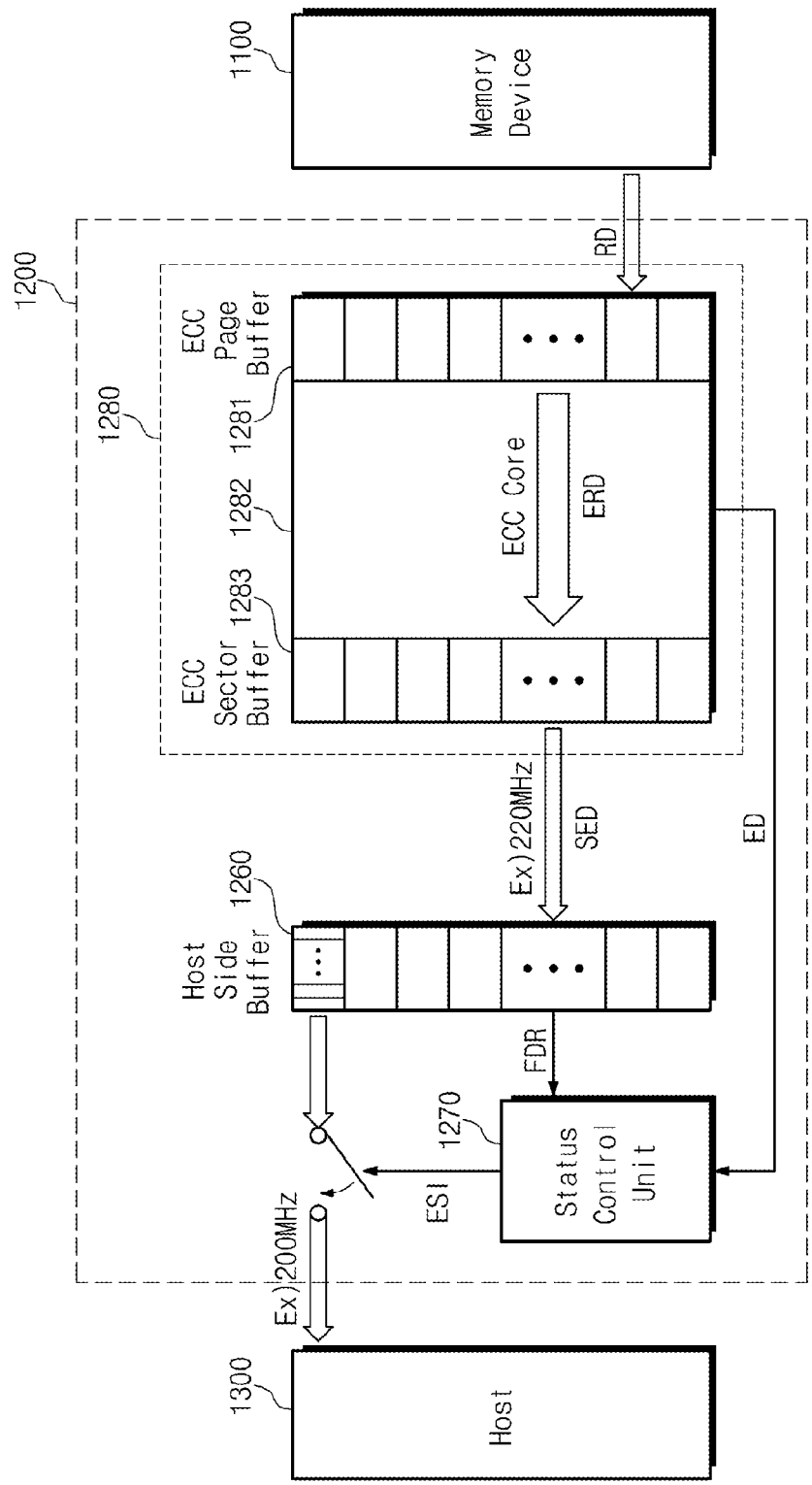
FIG. 6 is a block diagram schematically illustrating an ECC unit shown in FIG. 5, according to an embodiment of the inventive concept.

FIG. 6 is a block diagram schematically illustrating an ECC unit shown in FIG. 5, according to an embodiment. Referring to FIG. 6, the memory controller 1200 includes the host side buffer 1260, the status control unit 1270, and the ECC unit 1280. The ECC unit 1280 includes an ECC page buffer 1281, an ECC core 1282, and an ECC sector buffer 1283.

The memory controller 1200 receives coded read data RD from the memory device 1100. More particularly, the memory device 1100 reads a plurality of memory cells connected to a selected word line to generate the read data RD, and transfers the read data RD to the memory controller 1200. The read data RD is the same as the coded data DATA_C described above with reference to FIG. 1.

The memory controller 1200 stores the received read data RD in the ECC page buffer 1281 of the ECC unit 1280. The received read data RD stored in the ECC page buffer 1281 is transferred to the ECC core 1282.

The ECC core 1282 performs an error correction operation based on the read data RD to generate ECC read data ERD. The ECC read data ERD is data restored to original data through error correction of the read data RD received from the memory device 1100. The ECC core 1282 sends the ECC read data ERD to the ECC sector buffer 1283. When ECC execution is ended, an ECC done signal ED is transmitted to the status control unit 1270.

The ECC sector buffer 1283 stores the ECC read data ERD and divides the ECC read data ERD by the size of the system bus 1210 (refer to FIG. 5) of the memory controller 1200 to generate segmented ECC read data SED. The size of the segmented ECC read data SED may be smaller than that of data to be corrected by the ECC core 1282. For example, assuming that the ECC core 1282 performs error correction operation by a unit data size of 1 KB (B being byte), and the system bus 1210 has a data transfer size of 16 B, the ECC sector buffer 1283 divides the ECC read data ERD size of 1 KB by 16 B corresponding to the system bus size to generate 64 segmented ECC read data SED.

The ECC sector buffer 1283 sends the segmented ECC read data SED to the host side buffer 1260. At this time, the segmented ECC read data SED may be transmitted based on an internal clock signal generated by the internal clock generator 1230 (refer to FIG. 5). The host side buffer 1260 stores the segmented ECC read data SED. When inputting of first segmented ECC read data SED ends, the host side buffer 1260 activates a first data receiving signal FDR, which is sent to the status control unit 1270.

The status control unit 1270 receives the ECC done signal ED and the first data receiving signal FDR. When both the ECC done signal ED and the first data receiving signal FDR are activated, the status control unit 1270 generates an ECC status information signal ESI. The ECC status information signal ESI controls operation of the memory controller 1200 to transfer the segmented ECC read data SED stored in the host side buffer 1260 to the host 1300 (refer to FIG. 1).

The segmented ECC read data SED stored in the host side buffer 1260 may be transferred in synchronization with a clock that has a period slower than the internal clock signal. For example, assuming that the internal clock signal generated by the internal clock generator 1230 has a period of 220 MHz, the clock used to transfer data to the host 1300 may have a period of 200 MHz, which is slower than the internal clock signal. The segmented ECC read data SED the ECC sector buffer 1283 generates is transferred to the host side buffer 1260 in synchronization with 220 MHz being a period of the internal clock signal. The segmented ECC read data SED stored in the host side buffer 1260 is transmitted to the host 1300 in synchronization with 200 MHz slower than a period of the internal clock signal.

The host 1300 stably receives data because the data transfer speed of the system bus 1210 in the memory controller 1200 is faster than the data transfer speed of the host side buffer 1260 to the host 1300. Also, when data corresponding to the size of the an internal system bus is stored in the host side buffer 1260 before unit data for an error correction operation of the ECC core 1282 are all transferred to the host side buffer 1260, the stored data are instantly transferred to the host 1300, such that read latency is reduced.

Figure 7:
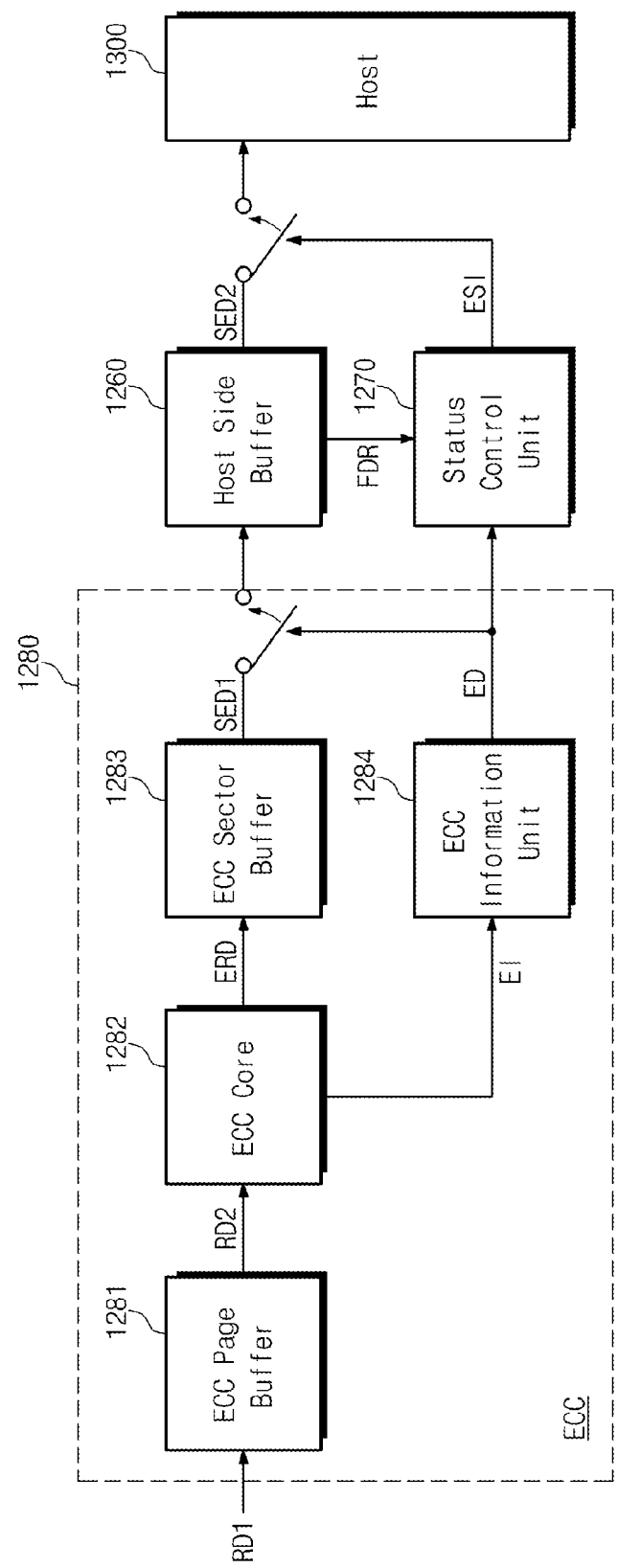
FIG. 7 is a block diagram schematically illustrating a relationship between an ECC unit shown in FIG. 5 and a host side buffer and a status control unit, according to an embodiment of the inventive concept.

FIG. 7 is a block diagram schematically illustrating a relationship between the ECC unit shown in FIG. 5 and a host side buffer and a status control unit, according to another embodiment. Referring to FIG. 7, the ECC unit 1280 includes the ECC page buffer 1281, the ECC core unit 1282, the ECC sector buffer 1283, and an ECC information unit 1284.

The ECC page buffer 1281 stores first read data RD1 provided from the memory device 1100 and outputs second read data RD2 to the ECC core unit 1282. Here, the first read data RD1 may be the same data as the coded data DATA_C shown in FIG. 1. The ECC core unit 1282 performs an error correction operation based on the second read data RD2, and generates ECC read data ERD and ECC information EI.

A detailed description of the operation performed by the ECC core unit 1282 is as follows. The ECC core unit 1282 performs an error correction operation on the second read data RD2 output from the ECC page buffer 1281. At this time, the ECC core unit 1282 performs an ECC decoding operation to transfer data read from the memory device 1100 to the host 1300. The ECC core unit 1282 corrects errors of the second read data RD2 to generate ECC read data ERD. The ECC core unit 1282 provides the ECC read data ERD to the ECC sector buffer 1283.

Also, if the ECC decoding operation has ended, the ECC core unit 1282 generates ECC information EI, which includes the number of data bits error corrected and ECC done information. The ECC core unit 1282 transfers the ECC information EI to the ECC information unit 1284.

The ECC sector buffer 1283 receives the ECC read data ERD from the ECC core unit 1282, and divides the ECC read data ERD by the size of the internal bus to generate segmented ECC read data SED1. For example, if the size of unit data of an ECC target is 1 KB and the size of the internal bus is 16 B, the ECC sector buffer 1283 generates 64 segmented ECC read data. The segmented ECC read data SED1 is output to the host side buffer 1260 in synchronization with an internal clock signal CLK (e.g., generated by internal clock generator 1230).

The ECC information unit 1284 receives the ECC information EI and generates an ECC done signal ED. When the ECC done signal ED is activated, the segmented ECC read data SED1 generated by the ECC sector buffer 1283 is sent to the host side buffer 1260.

The host side buffer 1260 receives the segmented ECC read data SED1 and generates first data receiving signal FDR. The first data receiving signal FDR may be generated when a first input of segmented ECC read data of the segmented ECC read data SED1 from the ECC sector buffer 1283 is completed. The host side buffer 1260 transmits segmented ECC read data SED2 to the host 1300 in response to the ECC status information ESI of the status control unit 1270. Structure and operation principles of the status control unit 1270 will be more fully described with reference to FIG. 8.

Figure 8:
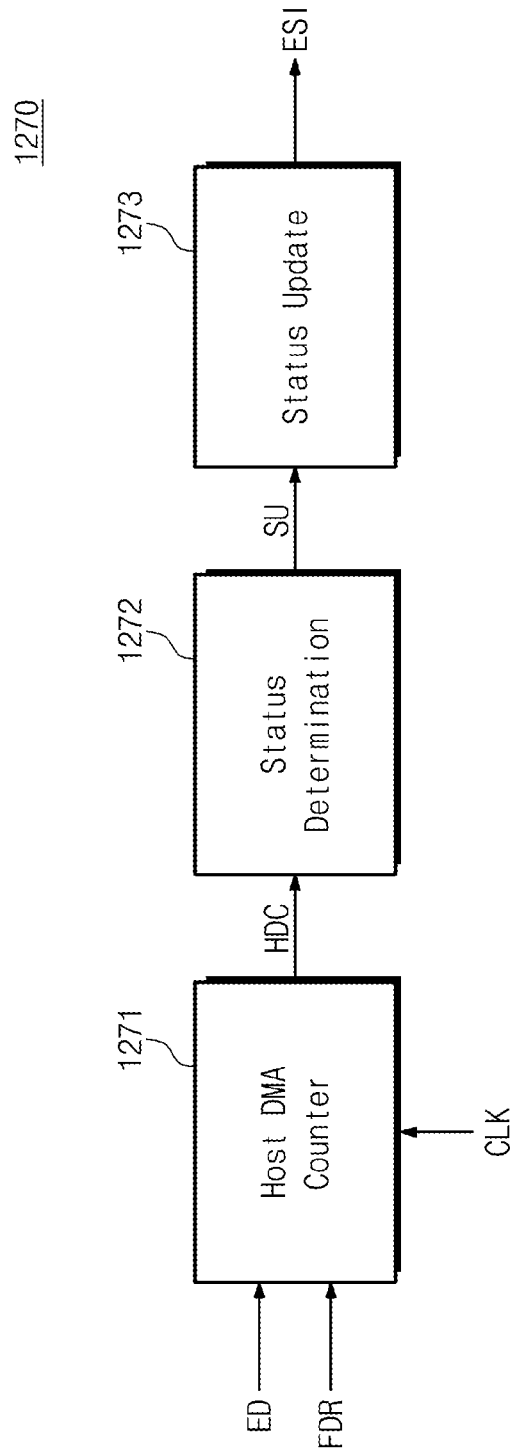
FIG. 8 is a block diagram schematically illustrating a status control unit shown in FIG. 7, according to an embodiment of the inventive concept.

FIG. 8 is a block diagram schematically illustrating a status control unit shown in FIG. 7, according to an embodiment of the inventive concept. Referring to FIG. 8, the status control unit 1270 includes a host DMA counter 1271, a status determination unit 1272, and a status update unit 1273.

The host DMA counter 1271 receives the ECC done signal ED and the first data receiving signal FDR, and generates a host DMA count HDC according to an internal clock signal (e.g., generated by internal clock generator 1230). For example, assuming that an active state of a signal is "H" or "1", when the ECC done signal ED and the first data receiving signal FDR are "H", the host DMA counter 1271 outputs the host DMA count HDC having a value of "1" in synchronization with a rising edge of a first internal clock signal CLK.

The value of the host DMA count HDC may increase in response to every rising edge of the internal clock signal when the ECC done signal ED and the first data receiving signal FDR are in an active state. When either one of the ECC done signal ED or the first data receiving signal FDR is inactive, the host DMA count HDC is not generated, and/or its value is not increased.

The status determination unit 1272 generates a status update signal SU based on the value of the host DMA count HDC. The status update signal SU is activated when the value of the host DMA count HDC is equal to a predetermined value. For example, the status determination unit 1272 may have a predetermined value of "1" to generate the status update signal SU. In this case, when the value of the host DMA count HDC is "1", the status determination unit 1272 generates the status update signal SU and outputs it to the status update unit 1273.

The status update unit 1273 generates ECC status information ESI in response to the status update signal SU. When the ECC status information ESI is activated, the segmented ECC read data SED2 is transferred from the host side buffer 1260 (refer to FIG. 7) to the host 1300. The segmented ECC read data SED2 may be the same data as the original data described with reference to FIG. 1. The ECC status information signal ESI may thus be used to indicate a state in which a transfer of data to the host 1300 is possible because the data generated as a result of ECC execution is all provided to the host side buffer 1260.

Figure 9:
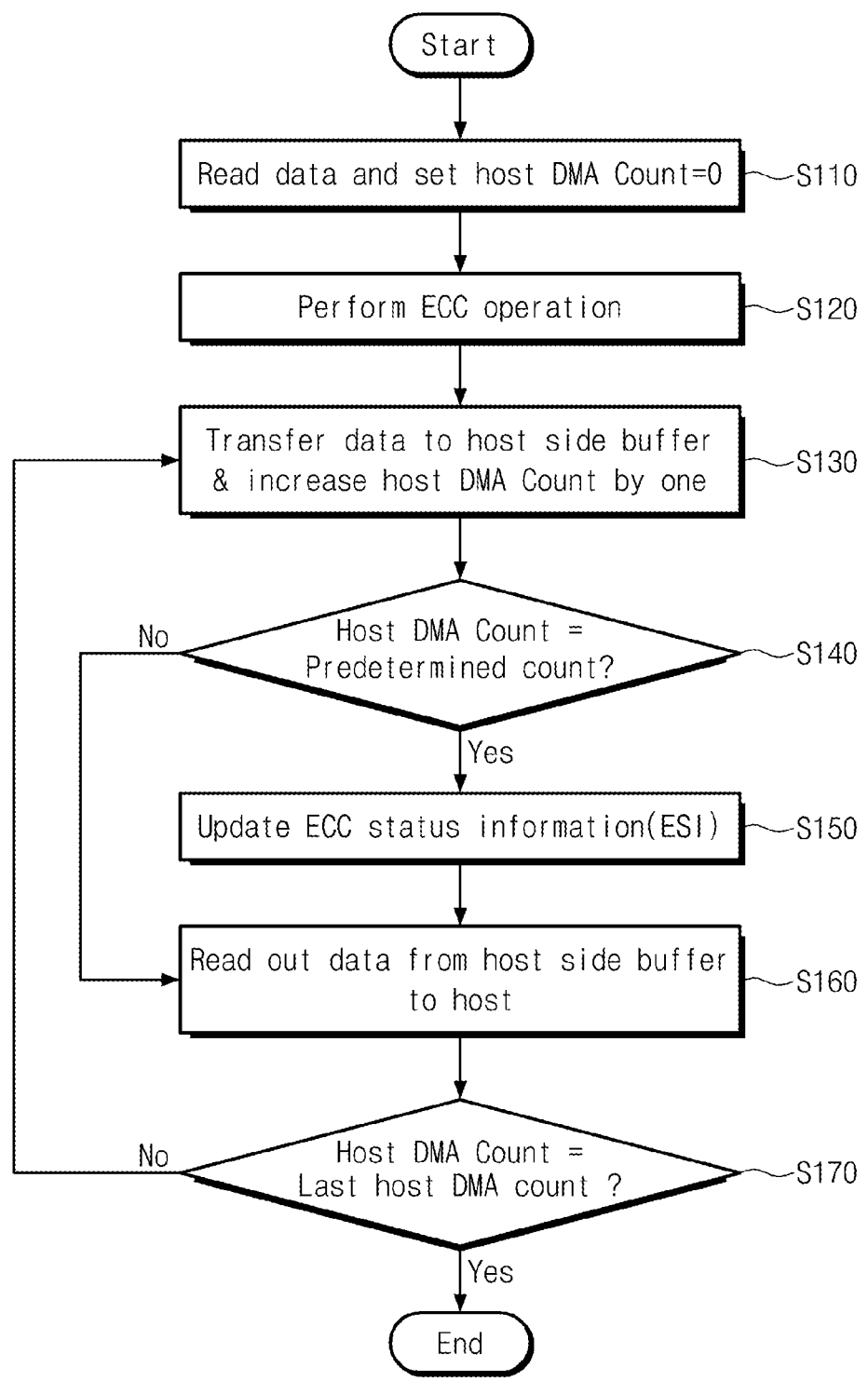
FIG. 9 is a flow chart schematically illustrating a data transfer method of a memory system, according to an embodiment of the inventive concept.

FIG. 9 is a flow chart schematically illustrating a data transfer method of a memory system, according to an embodiment of the inventive concept.

Referring to FIG. 9, in step S110, memory device 1100 (refer to FIG. 1) reads a plurality of memory cells connected to a selected word line to output read data RD to memory controller 1200 (refer to FIG. 1). Also, the memory controller 1200 sets (or resets) the value of a host DMA count HDC to "0".

In step S120, the memory controller 1200 performs an error correction operation on the read data RD to generate segmented ECC read data SED. The read data RD is stored in ECC page buffer 1281 (refer to FIG. 7). An ECC core 1282 (refer to FIG. 7) performs an error correction operation about the stored read data RD to generate ECC read data ERD. The ECC read data ERD may be stored in an ECC sector buffer 1283. Also, in step S120, ECC read data ERD may be generated by dividing the ECC read data ERD by the size of an internal bus (or, system bus 1210 shown in FIG. 5).

In step S130, the memory controller 1200 transfers the segmented ECC read data SED to host side buffer 1260 (refer to FIG. 5) and increases a value of a host DMA count HDC. For example, the value of the host DMA count HDC may be increased by 1, that is, host DMA count HDC=host DMA count HDC+1. The segmented ECC read data SED may be transferred to the host side buffer 1260 in synchronization with the host side buffer 1260. The value of the host DMA count HDC may increase whenever segmented ECC read data SED is transferred to the host side buffer 1260, based on an internal clock signal CLK.

In step S140, the memory controller 1200 compares the host DMA count HDC with a predetermined count. An ECC status information signal is selectively updated according to the comparison result. That is, when the host DMA count HDC is equal to the predetermined count, the method proceeds to step S150 where the ECC status information signal is updated, and then the ECC read data SED is read out from the host side buffer 1260 to host 1300 in step S160. When the host DMA count HDC is not equal to the predetermined count, the ECC status information is not updated, and the method proceeds directly to step S160, where the ECC read data SED is read out from the host side buffer 1260.

Here, the predetermined count may be a read latency count, for example. Read latency time is the time during which the host 1300 waits to receive read data, which time may be variable according to the value of the read latency count. For example, in the event that the read latency count is 3, read data may be transferred to the host when the host DMA count HDC is equal to 3. Otherwise, when the read latency time is compared to a read latency count value of 1, for example, the read latency time must further increase by two internal clock periods, that is, the host DMA count HDC increases by 2.

As mentioned above, a consequence of determining that the host DMA count HDC is equal to the predetermined count in steps S140, the memory controller 1200 updates ECC status information ESI in step S150 according to the comparison result and sends the segmented ECC read data SED to the host 1300 (refer to FIG. 1) in step S160. That is, after the ECC status information ESI is updated, the segmented ECC read data SED is sent from the host side buffer 1260 to the host 1300. When the host DMA count HDC is not equal to the predetermined count in step S140, the segmented ECC read data SED is transferred to the host 1300 in step S160 without additionally updating the ECC status information ESI.

In step S170, it is determined whether the host DMA count HDC is the last host DMA count HDC. If so, the method ends. If not, the method returns to step S130, and steps S130 through S170 are repeated until the last host DMA count HDC is reached.

Figure 10:
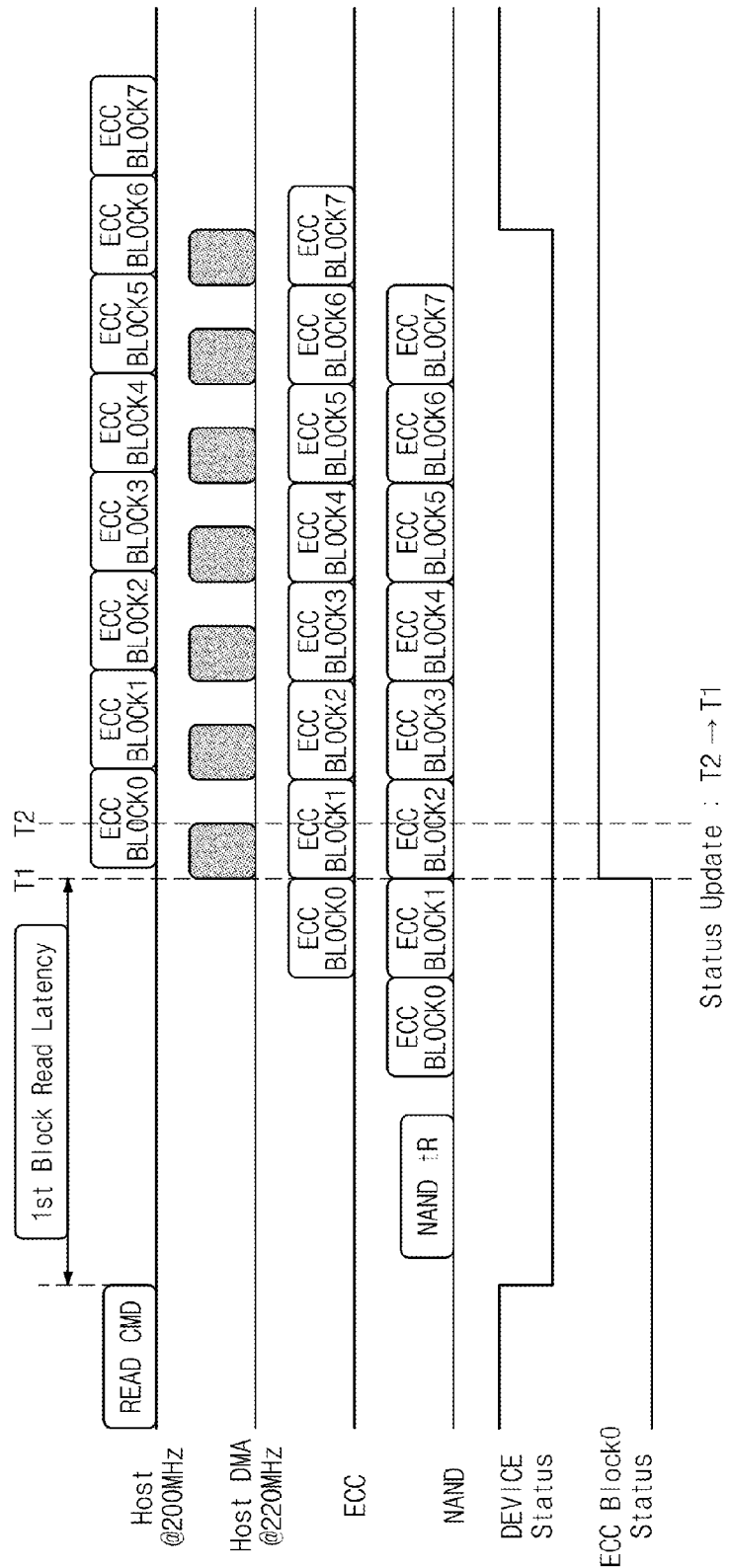
FIG. 10 is a timing diagram showing an operation method of a memory system, according to an embodiment of the inventive concept.

FIG. 10 is a timing diagram showing an operation method of a memory system according to an embodiment of the inventive concept. The memory device 1100 of the memory system 1000 (refer to FIG. 1) may be a NAND flash memory, for example, and the memory controller 1200 controls the NAND flash memory.

Referring to FIG. 10, host 1300 issues a read command READ CMD to the memory controller 1200. The memory controller 1200 instructs the memory device 1100 to perform a read operation in response to the read command READ CMD. At this time, a device status signal indicating the status of the memory device 1100 is in an inactive state, that is, indicating that a read operation is being executed.

When a time tR taken to read out data elapses, the memory device 1100 sends data corresponding to ECC unit blocks to the memory controller 1200. The memory controller 1200 stores the transferred read data RD and performs an error correction operation. The memory controller 1200 sends data obtained as a result of ECC execution to host side buffer 1260 to transfer the data to the host 1300. A step in which the memory controller 1200 transfers and stores data to the host side buffer 1260 may be referred to as a host DMA.

When first segmented ECC read data SED corresponding to the size of system bus 1210 arrives at the host side buffer 1260, the memory controller 1200 activates an ECC Block0 Status signal to transfer data to the host 1300. The ECC Block0 Status signal may be the same signal as ECC status information shown in FIG. 7. The memory controller 1200 transfers the segmented ECC read data SED to the host 1300.

In general, a conventional data transfer may be performed after all data of an ECC processing unit is transferred to the host side buffer 1260. In comparison, according to embodiments of the inventive concept, when first segmented ECC read data SED is provided to the host side buffer 1260, data begins to be transferred to the host 1300 and read latency is reduced from T2 to T1. Therefore, it is possible to perform a read operation at higher speed and to reduce a standby power.

Also, data are stably transferred by setting a period of the internal clock signal CLK, used by the system bus of the memory controller 1200, to be faster than a period of the clock used when data are transferred to the host 1300.

III. Applications of the Inventive Concept

Figure 11:
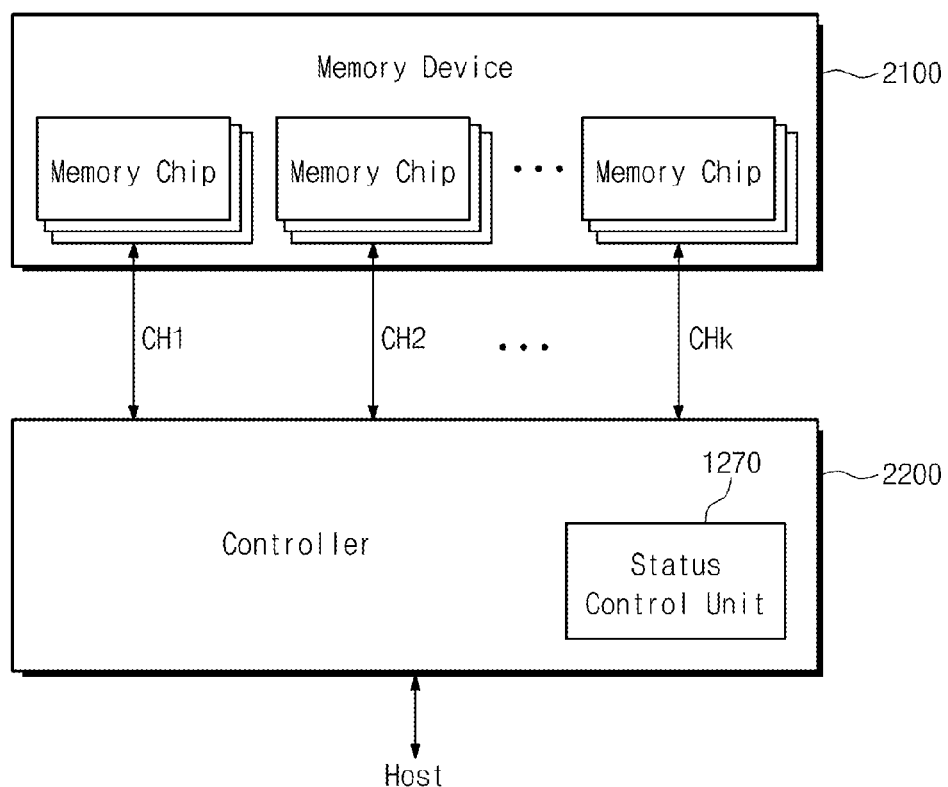
FIG. 11 is a block diagram schematically illustrating an application of a memory system shown in FIG. 1, according to an embodiment of the inventive concept.

FIG. 11 is a block diagram schematically illustrating an application of a memory system shown in FIG. 1, according to an embodiment of the inventive concept. Referring to FIG. 11, a memory system 2000 includes a memory device 2100 and a controller 2200. The memory device 2100 includes multiple memory chips. The memory chips are divided into a multiple groups. Memory chips in each group are configured to communicate with the controller 2200 through a common channel. In exemplary embodiments, the memory chips may communicate with the controller 2200 through channels CH1 to CHR.

The controller 2200 includes status control unit 1270, which may be the status control unit 1270 shown in FIG. 1. The controller 2200 reduces read latency according to commands from the status control unit 1270 to transfer data.

Figure 12:
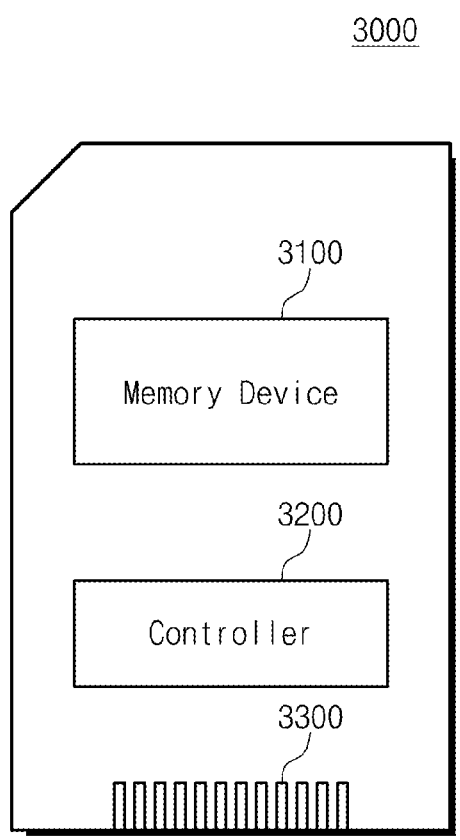
FIG. 12 shows an example of a card including a memory system, according to an embodiment of the inventive concept.

FIG. 12 shows an example of a card including a memory system according to an embodiment of the inventive concept. Referring to FIG. 12, a memory card 3000 includes a memory device 3100, a controller 3200, and a connector 3300.

The connector 3300 electrically connects the memory card 3000 to a host. The memory card 3000 may be, for example, a PC card, a compact flash card, a smart media card (SM, SMC), a memory stick, a multimedia card (MMC, RS-MMC, MMCmicro), an SD card (SD, miniSD, microSD, SDHC), a universal flash storage (UFS) device, and the like.

The controller 3200 includes a status control unit (not shown), such as status control unit 1270 shown in FIG. 1. The controller 3200 reduces read latency according to a command of a status control unit to transfer data.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method of operating a memory system comprising:
reading data from a plurality of memory cells connected to a selected word line to generate read data;
performing an error correction operation based on the read data and generating segmented error correcting code (ECC) read data;
transferring the segmented ECC read data to a host side buffer and increasing a value of a host DMA count;
comparing the value of the host DMA count with a read latency count value;
selectively updating an ECC status information signal according to the comparison result; and
transferring the segmented ECC read data to a host.

2. The method of claim 1, wherein when the value of the host DMA count is equal to the read latency count value, the ECC status information signal is updated and the segmented ECC read data are transferred to the host, and
wherein when the value of the host DMA count is not equal to the read latency count value, the segmented ECC read data are transferred to the host without updating the ECC status information signal.

3. The method of claim 1, wherein said performing the error correction operation based on the read data and generating the segmented ECC read data comprises:
storing the read data in an ECC page buffer;
generating ECC read data in an ECC core by performing an error correction operation based on the read data stored in the ECC page buffer; and
storing the ECC read data in an ECC sector buffer.

4. The method of claim 3, wherein said generating the segmented ECC read data comprises dividing the ECC read data by a size of an internal bus.

5. The method of claim 1, wherein the segmented ECC read data is transferred to the host side buffer in synchronization with an internal clock signal.

6. The method of claim 1, wherein the value of the host DMA count is increased when the segmented ECC read data are transferred to the host side buffer.

7. The method of claim 1, further comprising:
determining whether the value of the host DMA count is equal to a last host DMA count value; and
when the value of the host DMA count is not equal to the last host DMA count value, transferring the segmented ECC read data to the host side buffer and increasing the value of the host DMA count.

8. A memory system comprising:
a memory device; and
a memory controller configured to control the memory device, wherein the memory controller comprises:
an error correcting code (ECC) unit configured to perform an error correction operation based on read data received from the memory device, and to generate an ECC done signal and segmented ECC read data;
a host side buffer configured to receive the segmented ECC read data from the ECC unit and to generate a first data receiving signal;
a status control unit configured to receive the ECC done signal from the ECC unit and the first data receiving signal from the host side buffer, and to generate ECC status information in response to the ECC done signal and the first data receiving signal; and
a clock generator configured to generate an internal clock signal,
wherein the segmented ECC read data are output from the ECC unit in synchronization with the internal clock signal and are transferred to a host in response to the ECC status information, and
wherein the segmented ECC read data is transferred to the host in synchronization with a clock having a period slower than the internal clock signal.

9. The memory system of claim 8, wherein the ECC unit comprises:
an ECC page buffer configured to store the read data read out from the memory device;
an ECC core configured to perform the error correction operation based on the read data and to generate ECC read data and ECC information;
an ECC information unit configured to generate the ECC done signal based on the ECC information; and
an ECC sector buffer configured to divide the ECC read data by a size of an internal bus to generate the segmented ECC read data,
wherein the segmented ECC read data are output to the host side buffer in response to the ECC done signal.

10. The memory system of claim 9, wherein the ECC information comprises a number of data bits error corrected and ECC done information.

11. The memory system of claim 8, wherein the host side buffer is configured to generate the first data receiving signal based on the segmented ECC read data.

12. The memory system of claim 8, wherein the status control unit comprises:
   a host DMA counter configured to receive the ECC done signal and the first data receiving signal, and to generate a host DMA count according to the internal clock signal;
   a status determination unit configured to generate a status update signal based on a value of the host DMA count; and
   a status update unit configured to generate the ECC status information in response to the status update signal.

13. The memory system of claim 12, wherein when the ECC done signal and the first data receiving signal are activated, the value of the host DMA count increases according to the internal clock signal.

14. The memory system of claim 12, wherein the status update signal is activated when the value of the host DMA count is equal to a read latency count value.

15. A memory controller configured to control a memory device, the memory controller comprising:
   an error correcting code (ECC) unit configured to receive read data read from a plurality of memory cells connected to a selected word line of the memory device, to perform an error correction operation on the read data, and to generate an ECC done signal and segmented ECC read data;
   a host side buffer configured to receive the segmented ECC read data from the ECC unit and to generate a first data receiving signal; and
   a status control unit configured to receive the ECC done signal from the ECC unit and the first data receiving signal from the host side buffer, to increase a value of a host DMA count in response to the received ECC done signal and the first data receiving signal, to compare the value of the host DMA count with a read latency count value, and to selectively update an ECC status information signal according to the comparison result,
   wherein when the value of the host DMA count is equal to the read latency count value, the ECC status information signal is updated and the segmented ECC read data are transferred to a host from the host side buffer, and
   wherein when the value of the host DMA count is not equal to the read latency count value, the segmented ECC read data are transferred to the host from the host side buffer without updating the ECC status information signal.

16. The memory controller of claim 15, wherein the ECC unit comprises:
   an ECC page buffer configured to store the read data;
   an ECC core configured to generate ECC read data by performing an error correction operation on the read data; and
   an ECC sector buffer configured to store the ECC read data,
   wherein the segmented ECC read data are generated by dividing the ECC read data by a size of an internal bus.

17. The memory controller of claim 15, wherein the segmented ECC read data are transferred to the host side buffer in synchronization with an internal clock signal.

18. The memory controller of claim 15, wherein the value of the host DMA count increases whenever the segmented ECC read data are transferred to the host side buffer.

19. The memory controller of claim 15, wherein when the value of the host DMA count does not equal a last host DMA value, the segmented ECC read data is transferred to the host side buffer and the value of the host DMA count is increased.

* * * * *